(12) United States Patent
Pouliquen

(10) Patent No.: US 10,227,040 B2
(45) Date of Patent: Mar. 12, 2019

(54) VEHICLE PARKING ASSISTANCE METHOD AND DEVICE

(71) Applicant: STMicroelectronics (Grand Ouest) SAS, Delarue (FR)

(72) Inventor: Arnaud Pouliquen, Etival les le Mans (FR)

(73) Assignee: STMICROELECTRONICS (GRAND OUEST) SAS, Delarue (FR)

( * ) Notice: Subject to any disclaimer, the term of this patent is extended or adjusted under 35 U.S.C. 154(b) by 0 days.

(21) Appl. No.: 15/831,169

(22) Filed: Dec. 4, 2017

(65) Prior Publication Data
US 2018/0334098 A1  Nov. 22, 2018

(30) Foreign Application Priority Data
May 19, 2017  (FR) .................................... 17 54441

(51) Int. Cl.
*B60Q 9/00* (2006.01)
*G08G 1/16* (2006.01)

(52) U.S. Cl.
CPC ............. *B60Q 9/002* (2013.01); *G08G 1/168* (2013.01)

(58) Field of Classification Search
CPC ............................... B60Q 9/002; G08G 1/168
See application file for complete search history.

(56) References Cited

U.S. PATENT DOCUMENTS

| | | |
|---|---|---|
| 7,864,034 B2 | 1/2011 | Hijikata et al. |
| 2003/0108212 A1 | 6/2003 | Yun |
| 2006/0255920 A1 | 11/2006 | Maeda et al. |
| 2012/0081219 A1 | 4/2012 | Schiebahn |
| 2014/0346823 A1 | 11/2014 | Stebbins et al. |
| 2016/0114726 A1* | 4/2016 | Nagata .................. B60Q 9/007 340/435 |
| 2017/0096102 A1 | 4/2017 | Nallapa et al. |

* cited by examiner

*Primary Examiner* — Leon Flores
(74) *Attorney, Agent, or Firm* — Slater Matsil, LLP

(57) ABSTRACT

A method for vehicle parking assistance during a parking maneuver of the vehicle includes detecting an obstacle in a detection space outside the vehicle. Successive measurements are taken of the distance or distances separating the vehicle and the obstacle and the position or positions of the obstacle relative to the vehicle. Depending on the results of the measurements, human speech voice messages are generated that provide parking assistance. The voice messages are broadcasted in the passenger compartment of the vehicle.

21 Claims, 3 Drawing Sheets

VEHICLE PARKING ASSISTANCE METHOD AND DEVICE

CROSS-REFERENCE TO RELATED APPLICATIONS

This application claims priority to French Application No. 1754441, filed on May 19, 2017, which application is hereby incorporated herein by reference.

TECHNICAL FIELD

The present invention generally relates to electronic safety apparatuses for motor vehicles, such as electronic apparatuses comprising parking assistance devices that broadcast human speech voice messages.

BACKGROUND

Generally, a conventional parking assistance device for a vehicle 1s configured to generate a warning sound signal when an obstacle is detected by detectors such as ultrasonic sensors in a predefined area close to the vehicle.

The sound signal generally repeats a warning sound element such as a "beep". The frequency at which the sound element is repeated is commonly determined depending on the distance between the obstacle and the vehicle, and this frequency increases if the distance is reduced.

However, this sound signal does not allow the driver of the vehicle to know the exact distance between the obstacle and the vehicle.

Therefore, such a device generally relies upon a display, such as a multimedia screen, to indicate this position detected by the detectors. The driver of the vehicle needs to frequently check the display of such a device visually in order to know the current position of the obstacle, which is a visual distraction for the driver. In this respect, entry-level vehicles that do not have a suitable display therefore cannot take advantage of such a safety device, which is particularly useful in order to assist in the parking of vehicles.

The sound signal can also indicate the directivity of the obstacle relative to the vehicle by using a loudspeaker array of the vehicle. However, in order to perceive the directivity of the sound, the driver of the vehicle needs to have good hearing in both ears, which is unfortunately not always the case.

SUMMARY

Embodiments of the invention provide a simple and low-cost technical solution for informing the driver of a vehicle of the exact distance and position of an obstacle detected close to the vehicle, without requiring the visual attention of the driver, and doing so even if he or she is not able to perceive the directivity of a sound, or a display such as a multimedia screen.

In one embodiment of a parking assistance method for a vehicle, one or more obstacles are detected in a detection space outside the vehicle. Successive measurements are taken of the distance or distances separating the vehicle and the at least one obstacle and the position or positions of the obstacle relative to the vehicle. Human speech voice messages are generated, depending on the results of the measurements that provide parking assistance. The voice messages are broadcasted in the passenger compartment of the vehicle.

Since a driver will naturally be able to understand the voice messages, such a method makes it possible to make the driver of the vehicle aware of information relative to the measured distance or distances and position or positions of the obstacle, without looking at a multimedia screen in the vehicle.

The detection space can be close to the vehicle, for example within a radius of the order of 1.5 m outside the vehicle.

According to one implementation, the voice messages comprise, selectively, in decreasing order of priority, imminent warning information, information relative to the measured distance or distances, information relative to the measured position or positions, information relative to the nature of the obstacle, and metric units accompanying the measured distance or distances.

This information makes it possible to make the driver more clearly aware of the potential dangers caused by the obstacle present close to the vehicle.

Depending on the measured distance or distances, the information is presented selectively in the voice messages in such a way as to indicate, concisely and intuitively, the most critical information with respect to the distance or distances between the obstacle and the vehicle.

For example, the voice messages can comprise information relative to the nature and to the measured position or positions when the at least one obstacle is detected for the first time. This allows the driver of the vehicle to easily identify where the danger is coming from without having a visual of each newly detected obstacle.

According to one implementation, the imminent warning information comprises a "STOP" message and a "DANGER" message. The voice messages comprise, when the measured distance or distances are equal to or less than a first threshold, the "STOP" message. When the measured distance or distances are between the first threshold and a second threshold, the "DANGER" message, the voice messages further comprise, when two obstacles are detected, the measured positions of the two obstacles.

According to another implementation, the voice messages comprise, when the measured distance or distances are between the second threshold and a third threshold, the measured distance or distances.

The voice messages can, for example, comprise, when the measured distance or distances are greater than the third threshold, the measured distance or distances accompanied by the metric units.

For example, the generation of the voice messages can be triggered when a change in the measured distance or distances is equal to a first interval if the measured distance or distances are equal to or greater than the third threshold, or equal to a second interval if the measured distance or distances are less than the third threshold.

According to one implementation, the broadcasting of the voice messages comprises spatialization of the sound of the voice messages, depending on the measured position or positions, in order to make the location of the source transmitting the voice messages correspond with the measured position or positions of the obstacle relative to the driver of the vehicle.

According to another implementation, the language of the voice messages can be configured in order to match the language understood by the driver of the vehicle.

Advantageously, each user of the vehicle can select the language of his or her choice for the voice messages in order to ensure he or she instantly understands the voice messages. The voice messages can also be chosen, for example, from a dictionary.

In another embodiment, a parking assistance device includes a detector configured in order to detect, during a parking maneuver, an obstacle in a detection space outside the vehicle and to successively measure the distance or distances separating the vehicle and the obstacle and the position or positions of the obstacle relative to the vehicle. The parking assistance device further includes a processor configured to generate, depending on the results of the measurement, human speech voice messages providing parking assistance, and a speaker system configured to broadcast voice messages in the passenger compartment of the vehicle. As an example, the detection space can be close to the vehicle, for example within a radius of the order of 1.5 m outside the vehicle.

According to one embodiment, the processor is configured to generate the voice messages comprising, selectively, in decreasing order of priority, the following types of information: imminent warning information, information relative to the measured distance or distances, information relative to the measured position or positions, information relative to the nature of the obstacle, and metric units accompanying the measured distance or distances.

The imminent warning information can, for example, comprise a "STOP" message and a "DANGER" message. The processor can, for example, be configured to generate the voice messages comprising, when the measured distance or distances are equal to or less than a first threshold, the "STOP" message. When the measured distance or distances are between the first threshold and a second threshold, the "DANGER" message, the voice messages further comprise, when two obstacles are detected, the measured positions of the two obstacles.

According to another embodiment, the processor is configured to generate the voice messages that comprise, when the measured distance or distances are between the second threshold and a third threshold, the measured distance or distances.

According to yet another embodiment, the processor is configured to generate the voice messages that comprise, when the measured distance or distances are greater than the third threshold, the measured distance or distances accompanied by the metric units.

For example, the processor may be configured to trigger the generation of the voice messages when a change in the measured distance or distances is equal to a first interval if the measured distance or distances are equal to or greater than the third threshold, or equal to a second interval if the measured distance or distances are less than the third threshold.

According to one embodiment, the processor may be further configured to spatialize the voice messages depending on the measured position or positions. Then, the location of the source transmitting the voice messages corresponds with the measured position or positions of the obstacle relative to the driver of the vehicle.

The speaker system can, for example, comprise four loudspeakers arranged respectively at the front left, front right, rear left and rear right of the vehicle. Then, the processor can be configured to broadcast the voice messages via the loudspeaker or loudspeakers arranged in the position or positions corresponding to the measured position or positions of the obstacle.

The processor can, for example, be further configured to adapt the language of the voice messages to match the language understood by the driver of the vehicle.

The device can, for example, further comprise a haptic driver arranged in the driver's seat of the vehicle. The haptic driver is configured to generate vibration via at least one corresponding actuator depending on the measured position or positions (e.g., with the haptic driver driving the vibration). The vibration makes the location or locations of the source or sources of the vibration correspond with the measured position or positions of the obstacle relative to the driver of the vehicle.

According to another embodiment, a parking assistance apparatus for a vehicle, comprises a device as defined above.

According to yet another embodiment, a vehicle comprises an apparatus as defined above.

BRIEF DESCRIPTION OF THE DRAWINGS

Other advantages and features of the invention will be disclosed upon examination of the detailed description of implementations and embodiments, that are in no way limiting, and the appended drawings in which.

DETAILED DESCRIPTION OF ILLUSTRATIVE EMBODIMENTS

Figure 1:
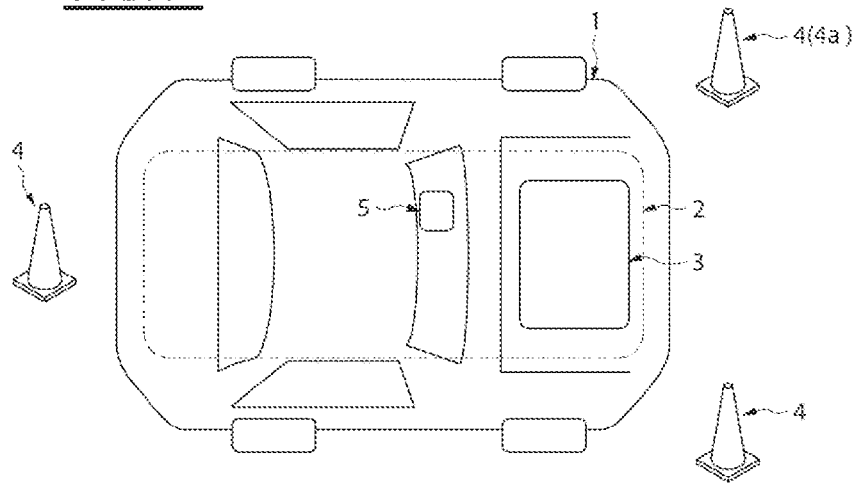
FIGS. 1 to 6 are schematic illustrations of the implementations and embodiments of the invention.

In FIG. 1, reference 1 denotes a vehicle, for example a car, comprising an apparatus 2, in this case a parking assistance apparatus.

In this case, the apparatus 2 comprises, for example, a parking assistance device 3 configured to detect at least one obstacle 4 close to the vehicle 1 and to inform the driver of the vehicle 1 of the information relative to this obstacle 4 in such a way as to prevent potential collisions between the vehicle 1 and the obstacle 4.

Although it is not essential to the operation of the device 3, the apparatus 2 can further comprise a display 5, in this case, for example, a multimedia screen, configured to visually illustrate the information relative to the obstacle 4. This advantageously makes it possible to provide the driver with additional visual indications to further improve the driver's understanding of the information generated by the device 3.

Figure 2:
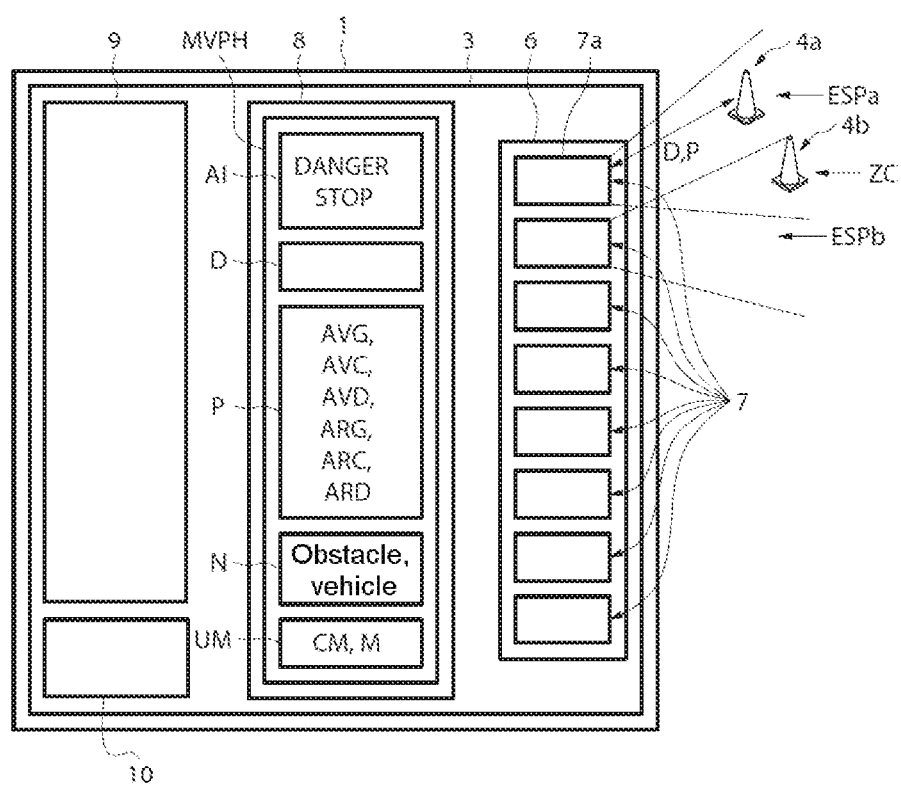

FIG. 2 illustrates in greater detail the structure of an example of the parking assistance device 3 according to one embodiment.

The device 3 comprises a detector 6, in this case, for example, a plurality of detection sensors, such as sonic or ultrasonic detection sensors 7, arranged at either the rear of the vehicle 1, at the rear and at the front, or all around the vehicle 1. Each of the sensors 7 is configured to emit sound waves, at regular intervals, towards a predefined detection space outside the vehicle, for example within a radius of 1.5 m outside the vehicle 1. Such sensors are known per se.

If any obstacle, for example, an obstacle 4a, appears in the predefined detection space ESPa of a sensor 7a, the sensor will receive the sound waves reflected by the obstacle 4a. Therefore, the sensor 7a can detect the presence of the obstacle 4a and measure the distance D separating the vehicle 1 and the obstacle 4a.

In this respect, the sensor 4a is configured, for example, to calculate the time gap between the emission of an emitted sound wave and the reception of the corresponding reflected sound wave, so as to determine the distance D.

Moreover, since the detection space of the sensor 7a is predefined, the position of the space relative to the vehicle 1s therefore known. Therefore, the position P, relative to the vehicle 1, of the obstacle 4a detected by the sensor 7a, is also determined.

It should be noted that the detection spaces of the sensors 7 can intersect. If an obstacle is simultaneously detected by two adjacent sensors, in this case, for example, the sensors 4a and 4b, the position P of the obstacle is located in a common area ZC of the detection spaces ESPa and ESPb corresponding to the two sensors 4a and 4b.

The device 3 further comprises a processor 8 implemented, for example, in the form of software or using specific circuits. The processor 8 is configured to analyze the distance or distances D and the position or positions P of the obstacle 4, measured by the sensors 7, and to generate, depending on the measured distance or distances D and position or positions P, human speech voice message MVPH, i.e. phrases or words in a language, in this case, for example, the English language, that the driver of the vehicle 1 will be able to understand directly and naturally.

It should be noted that the language of the voice messages MVPH can be configured via the processor 8 in order to match the language understood by the driver of the vehicle 1.

The processor 8 can, for example, comprise all of the official languages of the European Union in a memory if the vehicle 1 is to be sold and used in Europe.

The voice messages MVPH comprise, selectively, in decreasing order of priority, the following types of information: imminent warning information, information relative to the measured distance or distances, information relative to the measured position or positions, information relative to the nature of the obstacle, and metric units accompanying the measured distance or distances.

The imminent warning AI information comprises, for example, the words "DANGER" and "STOP", in order to warn of imminent dangers and suggest the vehicle be stopped immediately.

It should be noted that it is also possible to choose messages other than the words "DANGER" and "STOP", for example from a dictionary or a database.

With respect to the distance D information, the information comprises, for example, figures provided in centimeters if the measured distance or distances D are equal to or less than one meter, or otherwise figures provided in meters.

The position P information comprises, for example, at least indications such as "front left" AVG, "front center" AVC, "front right" AVD, "rear left" ARG, "rear center" ARC and "rear right" ARD, in order to inform the driver of the vehicle 1 of the position or positions P of the obstacle 4 relative to the vehicle 1.

It should be noted that the metric unit UM information comprises metric units "M" (meter) and "CM" (centimeter).

For example, the metric unit "CM" is used if the measured distance or distances do not exceed one meter. Otherwise, the unit "M" is used.

Information concerning the nature N depends on the detector 6 used. If basic sensors are used, the nature N always remains "Obstacle" because such sensors are not capable of distinguishing between an obstacle and a motor vehicle.

When the detector 6 comprises, for example, viewing cameras that have object recognition capabilities, the information concerning the nature N can comprise indications including, for example, the words "Obstacle", "Pedestrian" or "Vehicle".

The device 3 further comprises speaker system 9 configured to broadcast the voice messages MVPH in the passenger compartment of the vehicle 1.

Figure 3:
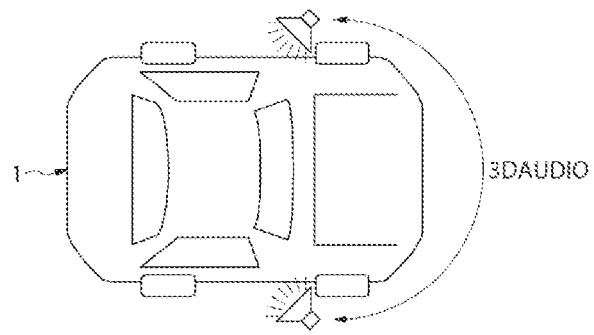

According to one embodiment, the speaker system 9 comprise two loudspeakers located at the front left and front right relative to the driver of the vehicle (FIG. 3). The loudspeakers can also be arranged, for example, on the headrest of the driver's seat.

In order to help the driver of the vehicle 1 better understand the voice messages MVPH, the processor 8 is further configured to spatialize the voice messages MVPH depending on the measured position or positions P in order to create illusions of locations of the voice messages MVPH relative to the driver of the vehicle 1, the locations corresponding to the measured position or positions P of the obstacle.

For example, the processor 8 uses 3D audio effect technology 3DAUDIO, which is known per se for the spatialization of voice messages MVPH.

Advantageously, the driver of the vehicle receives not only the voice messages MVPH clearly indicating the distance or distances and the position or positions of the obstacle, but also illusions of the locations of the messages MVPH. This dual information reinforces the driver's understanding.

Figure 4:
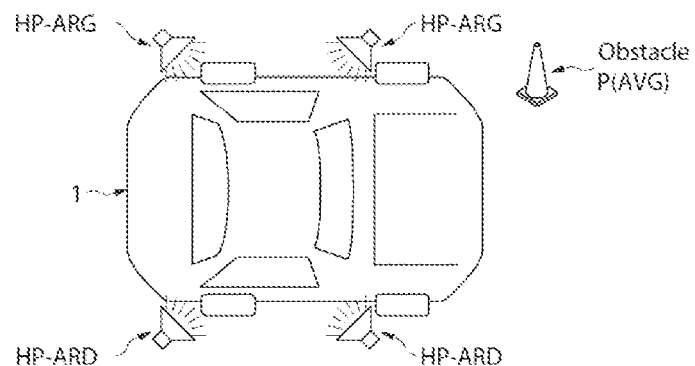

As a variant, the speaker system 9 comprises four loudspeakers arranged respectively at the front left HP-ARG, front right HP-ARD, rear left HP-ARG and rear right HP-ARD of the vehicle 1 (FIG. 4).

The processor 8 is configured to broadcast the voice messages MVPH via the loudspeaker or loudspeakers arranged in the position or positions corresponding to the measured position or positions of the obstacle.

In other words, if an obstacle is detected at the front left AVG of the vehicle 1, the voice messages MVPH comprising the information concerning the position P of same are broadcast via the corresponding loudspeaker, i.e., the loudspeaker HP-AVG arranged at the front left of the vehicle 1.

It should be noted that 3D audio effect technology 3DAUDIO can also be used with a loudspeaker audio array comprising more than two loudspeakers.

Figure 5:
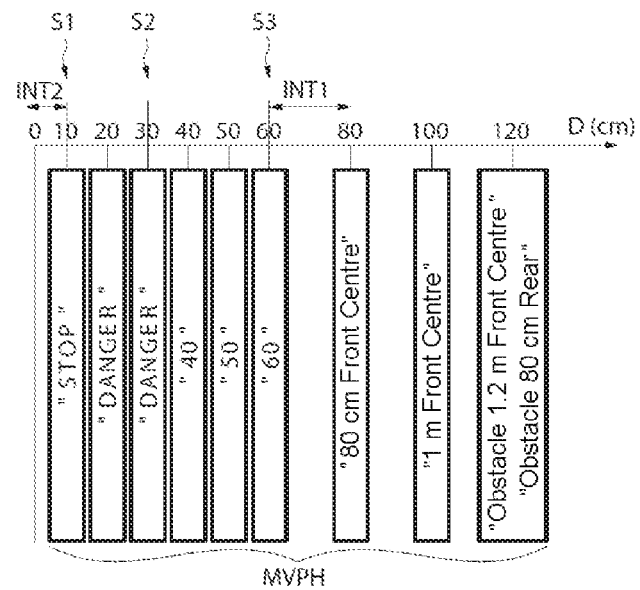

FIG. 5 is a schematic illustration of an example of a parking assistance method using the device 3 described above and implemented during a parking maneuver of the vehicle.

After activating the device 3, the voice messages MVPH are generated if an obstacle 4 is detected by the detector 6.

The first message MVPH following the detection of a new obstacle comprises the information relative to the nature N of the obstacle and to the position or positions P, in this case, for example, "Obstacle Front Centre" illustrated in FIG. 3.

Depending on the measured distance or distances D, the generation of the messages MVPH is triggered at different speeds.

If the distance or distances D are less than a first threshold S1, in this case, for example, 10 cm, the messages MVPH comprise the word "STOP" to prompt the driver to stop.

If the distance or distances D are between the first threshold S1 and a second threshold S2, in this case, for example, 30 cm, the messages MVPH comprise the word "DANGER".

If the distance or distances are between the second threshold S2 and a third threshold S3, in this case, for example, 60 cm, the messages MVPH comprise the information concerning the measured distance or distances D without the unit UM information, for example "40", "50" or "60".

When the distance or distances D exceed the third threshold S3, the messages MVPH comprise the information concerning the distance or distances D, the units UM, and the position or positions P.

Moreover, the generation of the messages MVPH is triggered when a change in the measured distance or distances D is equal to a first interval INT1, in this case, for example, 20 cm, and if the measured distance or distances are equal to or greater than the third threshold S3.

If the measured distance or distances D are less than the third threshold S3, the generation is triggered when the change in the measured distance or distances D is equal to a second INT2, in this case, for example, 10 cm.

It should be noted that the messages MVPH comprise, at least once, the information relative to the nature N of the obstacle and of the position or positions P when an obstacle 4 is newly detected.

Furthermore, if several obstacles 4 are detected at the same time by the detector 6, the information concerning the positions P of the obstacles 4 is included alternately in the voice messages MVPH.

For example, when a first obstacle and a second obstacle are detected respectively 1.2 m from the front center and 80 cm from the rear, the first voice messages MVPH comprise, alternately, the following information for the obstacles: "Obstacle 1.2 m Front Centre" and "Obstacle 80 cm Rear". Depending on the changes in these distances D, the subsequent voice messages MVPH comprise, for example "60 cm Front Centre" and "DANGER Rear".

The method finishes if there is no further change in the measured distances D and the speed of the vehicle 1 is zero, and it is activated when a new obstacle is detected or the vehicle 1 moves at any speed.

The invention is not limited to the embodiments described herein but encompasses all variants thereof.

Figure 6:
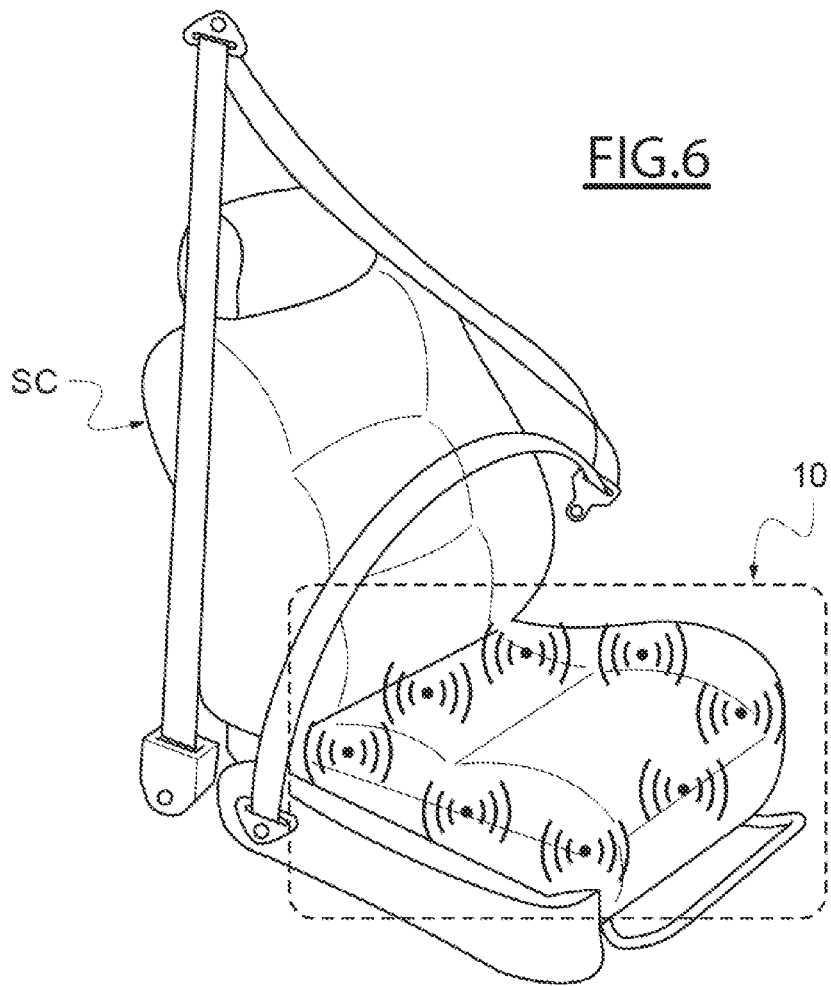

As illustrated in FIG. 6, the device 3 can further comprise, for example, haptic driver to arranged in the driver's seat SC of the vehicle 1.

The haptic driver to can comprise several vibration actuators, each corresponding to a possible position of the obstacle 4. The haptic driver to is configured to generate a vibration via a corresponding actuator depending on the measured position or positions, in order to make the location or locations of the source or sources of the vibration correspond with the position or positions of the obstacle relative to the driver of the vehicle.

What is claimed is:

1. A method, comprising:
   detecting, before a vehicle is parked, an obstacle in a detection space outside the vehicle;
   successively taking a plurality of measurements of a distance between the vehicle and the obstacle, and of a positioning of the obstacle relative to the vehicle;
   determining, according to the plurality of measurements, whether to generate an audible verbal message that conveys parking assistance information;
   determining, according to the plurality of measurements, a content of the parking assistance information; and
   when it is determined to generate the audible verbal message, broadcasting the content in the audible verbal message into an interior of the vehicle;
   wherein the content comprises a verbal description of a measurement: of the distance between the vehicle and the obstacle; or of the positioning of the obstacle relative to the vehicle.

2. The method according to claim 1, further comprising defining a size of the detection space with a radius from the vehicle.

3. The method according to claim 2, wherein the radius is substantially equal to or less than 1.5 meters from an exterior of the vehicle.

4. The method according to claim 1, wherein the content of the parking assistance information further comprises:
   (a) an imminent warning;
   (b) a characteristic of the obstacle; or
   (c) metric units accompanying the measurement of the distance.

5. The method according to claim 1, wherein a characteristic of the obstacle and a measurement of the positioning of the obstacle relative to the vehicle are included in the parking assistance information when the obstacle is detected for a first time.

6. The method according to claim 4, wherein the imminent warning comprises a "STOP" message when the measurement of the distance is equal to or less than a first threshold, and a "DANGER" message when the measurement of the distance is between the first threshold, and a second threshold.

7. The method according to claim 6, wherein the obstacle comprises a first obstacle and a second obstacle, and the measurement in the content comprises a measurement of the positioning of the first obstacle relative to the vehicle, and a measurement of the positioning of the second obstacle relative to the vehicle.

8. The method according to 7, wherein, when a measurement of a distance is between the second threshold and a third threshold, the parking assistance information comprises a measurement of the distance in metric units.

9. The method according to claim 8, wherein determining whether to generate the audible verbal message comprises triggering a generation of the audible verbal message when a change between two measurements of the distance is equal to a first interval, when one measurement of the distance is equal to or greater than the third threshold, or when the change between two measurements of the distance is equal to a second interval when one measurement of the distance is less than the third threshold.

10. The method according to claim 1, wherein broadcasting comprises spatializing a sound of the audible verbal message within the interior of the vehicle to correspond a positioning of a source of the sound to the positioning of the obstacle relative to the vehicle, according to a measurement of the positioning of the obstacle.

11. A parking assistance apparatus, comprising:
   a sensor configured to detect, before a vehicle is parked, an obstacle in a detection space outside the vehicle, and to successively take a plurality of measurements of a distance between the vehicle and the obstacle, and of a positioning of the obstacle relative to the vehicle;
   a speaker system configured to transmit an audible verbal message into an interior of the vehicle;
   a processor coupled to the sensor and the speaker system, wherein the processor is configured to:
      receive the plurality of measurements from the sensor;
      determine, according to the plurality of measurements, whether to generate the audible verbal message to convey parking assistance information to an occupant of the vehicle; and
      when it is determined to generate the audible verbal message, to:

generate a content of the parking assistance information to be conveyed in the audible verbal message; and output the content in the audible verbal message to the speaker system;

wherein the content comprises a verbal description of a measurement: of the distance between the vehicle and the obstacle; or of the positioning of the obstacle relative to the vehicle.

12. The parking assistance apparatus according to claim 11, wherein the processor is configured to define a dimension of the detection space for the sensor with a radius of 1.5 m from the vehicle.

13. The parking assistance apparatus according to claim 11, wherein the content further comprises:

(a) an imminent warning;
(b) a characteristic of the obstacle; or
(c) metric units accompanying the measurement of the distance.

14. The parking assistance apparatus according to claim 11, wherein the processor is configured to generate the content of the parking assistance information, by being configured to select for the content, when the obstacle is first detected by the sensor, a characteristic of the obstacle, and a measurement of the positioning of the obstacle relative to the vehicle.

15. The parking assistance apparatus according to claim 13, wherein the imminent warning comprises a "STOP" message when the measurement of the distance is equal to or less than a first threshold, and a "DANGER" message when the measurement of the distance is between the first threshold or a second threshold.

16. The parking assistance apparatus according to claim 15, wherein the processor is configured to select for the audible verbal message, the measurement of the distance, when the measurement of the distance is between the second threshold and a third threshold, and the measurement of the distance in metric units, when the measurement of the distance is greater than the third threshold.

17. The parking assistance apparatus according to claim 11, wherein the processor is configured to determine to generate the audible verbal message when a change between two measurements of the distance is equal to a first interval when one measurement of the distance is equal to or greater than a threshold, or equal to a second interval when one measurement is less than the threshold.

18. The parking assistance apparatus according to claim 11, wherein the speaker system comprises a plurality of loudspeakers, and the processor is further configured to select one of the plurality of loudspeakers, and spatialize a sound of the audible verbal message within the interior of the vehicle to correspond to the positioning of the obstacle relative to the vehicle, according to a measurement of the positioning of the obstacle.

19. The parking assistance apparatus according to claim 18, wherein the plurality of loudspeakers comprises four loudspeakers disposed at a plurality of locations in the interior of the vehicle, wherein a first loudspeaker is disposed at a front left, a second loudspeaker is disposed at a front right, a third loudspeaker is disposed at a rear left, and a fourth loudspeaker is disposed at a rear right of the interior of the vehicle, and the processor is configured to select one of the four loudspeakers corresponding to the positioning of the obstacle relative to the vehicle.

20. A parking assistance system, comprising:

a sensor adapted to detect, before a vehicle is parked, an obstacle in a detection space outside the vehicle, and to successively take a plurality of measurements of a distance between the vehicle and the obstacle, and of a positioning of the obstacle relative to the vehicle;

a speaker system adapted to transmit an audible verbal message into an interior of the vehicle;

a haptic driver disposed inside a seat of an occupant of the vehicle, wherein the haptic driver comprises an actuator adapted to vibrate a location of a plurality of locations on a seat;

a non-transitory memory; and a processor coupled to the sensor, the speaker system and the non-transitory memory;

wherein the processor is adapted to execute a program stored in the non-transitory memory to:

receive the plurality of measurements from the sensor;

determine, according to the plurality of measurements, whether to generate the audible verbal message to convey parking assistance information to an occupant of the vehicle; and when it is determined to generate the audible verbal message, to:

generate a content of the parking assistance information;

output a first signal with the audible verbal message to the speaker system, and an indication to the speaker system to transmit the audible verbal message as originating from a source location in the interior of the vehicle corresponding to the positioning of the obstacle relative to the vehicle; and output to the haptic driver, a second signal to cause the actuator to vibrate the seat of the occupant in a location corresponding to the positioning of the obstacle relative to the vehicle.

21. The parking assistance system according to claim 20, further comprising the vehicle, wherein the sensor, the speaker system, the haptic driver, the non-transitory memory, and the processor are disposed in the vehicle.

* * * * *